United States Patent [19]

Dinsdale

[11] 4,229,635
[45] Oct. 21, 1980

[54] CONTROL OF AN ELECTRO-DISCHARGE MACHINE TOOL

[75] Inventor: Raymond Dinsdale, Nelson, England

[73] Assignee: Rolls-Royce Limited, London, England

[21] Appl. No.: 941,578

[22] Filed: Sep. 12, 1978

[30] Foreign Application Priority Data

Oct. 8, 1977 [GB] United Kingdom ............ 41961/77

[51] Int. Cl.³ .................................................. B23P 1/12
[52] U.S. Cl. ................................. 219/69 G; 219/69 C
[58] Field of Search ................ 219/69 G, 69 M, 69 E

[56] References Cited

U.S. PATENT DOCUMENTS

| | | | |
|---|---|---|---|
| 3,125,700 | 3/1964 | Bentley et al. | 219/69 G |
| 3,562,476 | 3/1968 | Rupert | 219/69 G |
| 3,729,609 | 4/1973 | Check et al. | 219/69 G |
| 4,146,770 | 3/1979 | Dinsdale et al. | 219/69 M |

Primary Examiner—Thomas J. Kozma
Assistant Examiner—Clifford C. Shaw
Attorney, Agent, or Firm—Cushman, Darby & Cushman

[57] ABSTRACT

Electro-discharge machining device including means for preventing the machining electrode from surging forward when the electrode breaks through a workpiece. The machining electrode is mounted on a first movable member including a portion which engages a motor driven second movable member. Once the first and second movable members are engaged, the first movable member is constrained to move toward the workpiece at a speed no greater than the speed of the second movable member. Sensing and signalling means control the speed of the second movable member by a signal representing the proximity of the first and second movable members.

5 Claims, 3 Drawing Figures

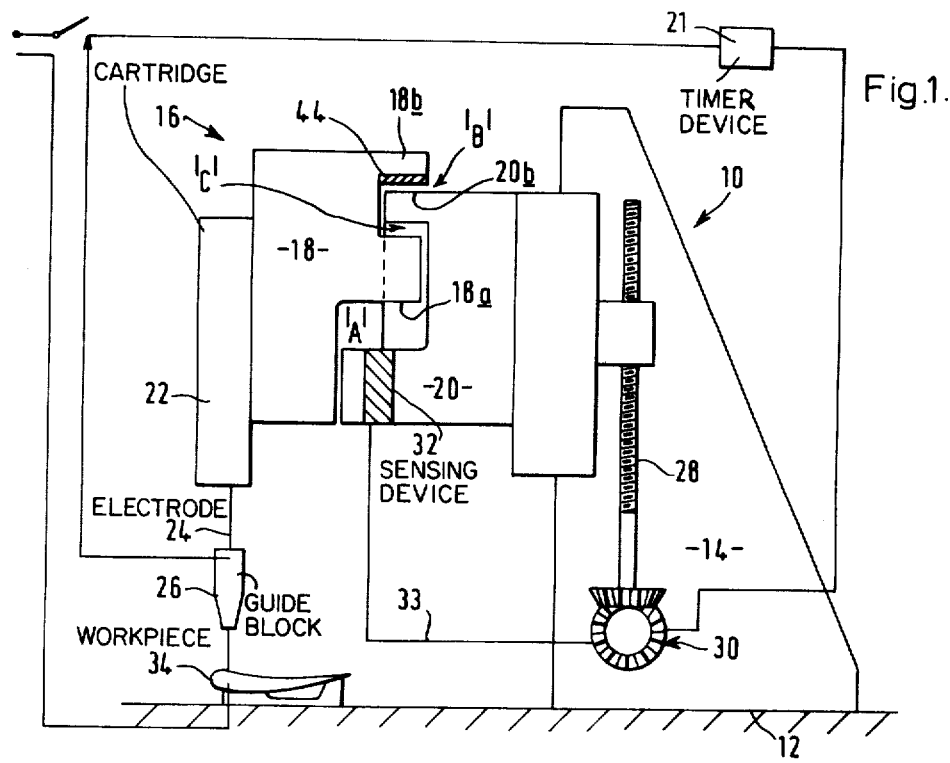
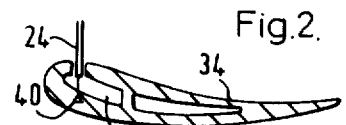
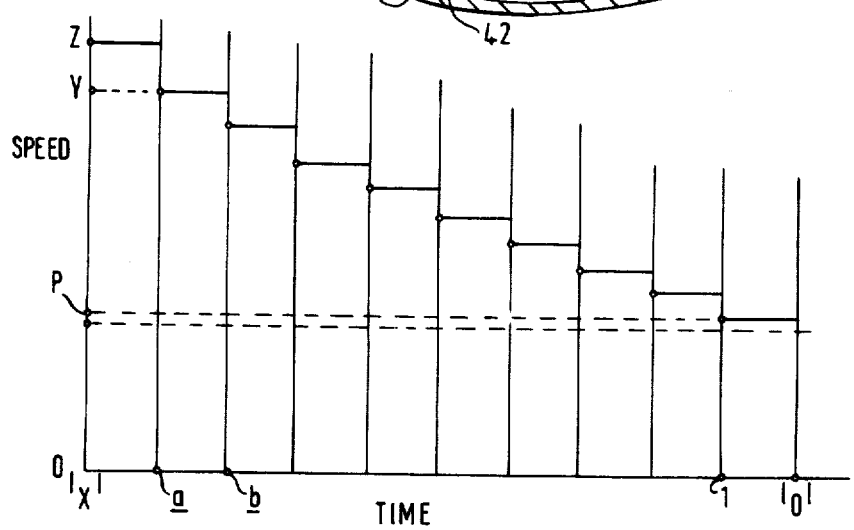

CONTROL OF AN ELECTRO-DISCHARGE MACHINE TOOL

This invention relates to the controlling of an electrodischarge machine tool.

An electrodischarge machine tool effects machining of a hole or holes in a workpiece, by repeatedly presenting an electrode to the workpiece and delivering a pulse of electricity thereto via the electrode. The energy developed is expended in removing metal from the workpiece. A flow of a dielectric fluid e.g. paraffin, is maintained over the area being machined, to discourage electrical flow from electrode to workpiece, until such time as the required electrical potential has been achieved between them.

The speed with which the electrode travels towards the workpiece, is determined by the magnitude of electrical potential between them. Signals representing the electrical potential are transmitted to a servo mechanism, which then operates to adjust the relative positions of electrode and workpiece.

The system creates problems in situations where an electrode is required to drill through a thickness, into a pre-formed passage for, on breaking through of the electrode, there is an immediate rise in potential because of the sudden gap which has been formed between the electrode end and the opposite wall of the pre-formed passage.

A signal appropriate to the then high potential is transmitted to the servo mechanism, which immediately causes the electrode to accelerate across the pre-formed passage so as to reduce the gap, whereupon the electrode contacts the opposing wall.

In such circumstances, the passage wall is machined unintentionally. Such a result may make it necessary to scrap the workpiece.

An apparatus has been devised which comprises a pair of auxiliary rod electrodes, arranged to operate as a machining electrode and a workpiece. The potential across these electrodes is utilised to operate the servo mechanism in the same way as the potential across the ordinary electrode and workpiece, and the arrangement is such that, if the ordinary electrode breaks through the wall thickness of its complementary workpieces, the rise in potential across the resulting gap, though sensed by the servo mechanism, has its effect thereon quickly obviated by the lower potential across the still normally operating auxiliary electrodes. Thus the acceleration of the ordinary machining electrode across the gap is stayed.

Such apparatus is disclosed in U.S. Pat. No. 4,407,504 issued on Aug. 15, 1978 to Dinsdale and has proved to work perfectly as regards controlling electrode breakthrough. However, the apparatus described in U.S. Pat. No. 4,107,504 has one drawback, at least in those circumstances where only one electrode is used, or where only a few electrodes are used simultaneously.

It has been found that one, or a few electrodes, can machine through a workpiece thickness more quickly than one auxiliary electrode can machine the other. Consequently, the speed of machining is controlled by the performance of the auxiliary electrodes with resultant increase in production time.

This invention seeks to provide apparatus with which to control the speed of breakthrough of an electrode during an electro-discharge machining operation.

According to the present invention there is provided apparatus with which to perform electro-discharge machining, comprising first and second relatively slidable members, the first of which in operation, carries at least one machining electrode, the members being arranged such that the second member limits the magnitude of freedom of the first member to slide in the direction of machining and drive means connected to drive the second member in the direction of machining at a rate which, at least in the latter stages of a machining operation, is less than the rate of movement the first member could achieve in said direction, by virtue of prevailing electrical conditions across the electrode and a workpiece, the second member therefor limiting the rate of advance of the at least one machining electrode.

The invention will now be described by way of example and with reference to the accompanying drawings in which:

FIG. 1 is a diagrammatic view of an electro-discharge machine tool,

FIG. 2 is an enlarged part view of FIG. 1 and,

FIG. 3 is a graph showing rear slide member speed reduction, plotted against time of machine operation.

In FIG. 1 an electro-discharge machine tool is designated 10. The tool comprises a base 12 which supports a vertical column 14. A compound slide assembly 16 is made up from a first member 18 mounted for limited sliding movement on a second member 20. Sliding of member 18 relative to member 20 takes place in a vertical direction and is of a reciprocatory nature.

Member 18 carries a cartridge 22 which is rigidly fixed to the member and in the present example, holds a rod electrode 24. A guide block 26 maintains the electrode in a straight line.

The second member 20 registers in sliding engagement with column 14 but is movable in a vertical plane, though only on rotation of a lead screw 28, by a stepping motor 30.

Member 20 carries a sensing device 32 in its bottom portion, the operation of which will be explained later in this specification.

Members 18 and 20 are assembled together so that three gaps 'A', 'B' and 'C' are attained and so that gap 'A' is large relative to the two other gaps 'B' and 'C'.

Gap 'C' on commencement of operation of the machine tool, is such as to only allow sufficient room in the vertical direction, for member 18 to be reciprocated under the control of the servo mechanisms (not shown) as described hereinbefore. This automatically makes gap 'A' as large as possible and allows the electrode to machine at a rate controlled by conditions at the machining zone. Gap 'B' is of sufficient magnitude to allow member 18 to move downwards relative to member 20, until member 18 affects sensor 32.

Member 18 and therefore, its associated electrode, is reciprocated relative to member 20 by the servo mechanisms. However, such a mechanism is described in U.S. Pat. No. 4,107,504. The overall effect is that member 18 moves downwards as viewed in FIG. 1 and, electrode 24 penetrates the workpiece 34.

As member 18 moves downwards, the gap 'A' reduces and when the gap reaches a pre-selected magnitude, the nearness of the undersurface 18a of member 18, to device 32, is sensed by device 32.

In the present example, sensor device 32 comprises an oscillator and coil, to which a positive voltage is applied. In operation, when the first member approaches the upper end of the sensor, its metal mass damps the coil and the oscillator stops oscillating. A continuous signal is produced and passed via line 33 to stepper motor 30 to cause it to rotate at a given speed. Thus, lead screw 28 is rotated such that member 20 is caused to move down column 14 at a speed which is a little faster than the machining speed of electrode 25. Consequently, gap 'A' widens again until it is of sufficient magnitude to remove the influence of member 18 from sensor 32. The coil becomes undamped and its associated oscillator starts to oscillate again. The latter effect cancels the motor actuation signal and the stepper motor 30 stops rotating. Member 20 then rests in its new position.

A timer device 21 is included in the machining electrical circuit and is connected to motor 30. When power is switched on, the timer device immediately transmits signals to the stepping control system of the motor, so as to control its speed of rotation, should the motor be actuated by a signal emitted by sensor 32.

The timer device ensures that the motor rotates at a given speed for a given time period, regardless of how many signals it receives from sensor 32 in that given time period. For example, if it is known from experience that a nominal time period often minutes is required to perform a complete drilling operation, the timer could be arranged such that, from the moment it became operative, then for the first minute thereafter, the motor 30, if actuated by a sensor signal, would only rotate at a predetermined speed. The speed would be such as to move member 20 downwards slightly faster than the machining speed of electrode 24. During the second minute of operation of time 21, the motor, if actuated, would rotate only at a speed somewhat slower than previously, but which would still be slightly faster than the present machining speed of electrode 24, the machining rate of which will have slowed because of worsening conditions in the machining zone. At one minute intervals the timer would reduce the rate at which motor 30 could rotate, if actuated by a sensor signal, until the ten minute period came to an end whereupon the motor if actuated further, would continue to rotate at the last selected speed.

When electrode breakthrough of the workpiece wall causes electrical potential across electrode and workpiece to rise steeply, the servo mechanism (not shown) attempts to rush the electrode across the cavity, to achieve a proper gap condition. However, the move is stopped almost instantaneously, because the top abutment portion 18b of member 18 registers on the top abutment 20b of member 20, closing gap 'B'. Member 20 is moving at a preselected speed, consequently member 18 must now move at that same speed. In this way, closing of the electrode 24 with the opposite wall 40 of the cavity 42 is avoided and time is gained to observe breakthrough and switch off machining current. Machining of the opposing cavity wall is thus avoided.

Breakthrough detection and power switch off means, such as those described in U.S. Pat. No. 4,146,770 could be used in conjunction with the present invention.

The surface 44 which forms the upper boundary of gap 'B' comprises a lining of rubber or other resilient material. When gap 'B' closes, the lining will absorb the shock of the collision of member 18 with member 20.

FIG. 3 is a graph showing stepped reduction in speed of rotation of motor 30, plotted against time intervals of one minute duration, over a ten minute period. Thus for the first minute 'Xa' of the period 'XO' if motor 30 is actuated by signals from sensor 32, it will rotate at speed 'Z'. If the motor is actuated at any time during the second period 'ab' of one minutes, it will rotate at speed 'Y' and so on.

The apparatus can be used without the timer device i.e. the stepper motor 30 can have its rotational speed stepped down with each actuation signal received from sensor 32. However, in practice, the sensor is affected so frequently that where a workpiece wall of any significant thickness (say 0.125") is drilled, the rotational speed of the motor is reduced too quickly. Consequently, the electrode is not allowed to machine through the workpiece, as quickly as it would otherwise do and production time is increased. The timer device should therefore be used, except when thin walled (say 0.020") workpieces are being drilled.

I claim:

1. Electro-discharge machining apparatus for machining a workpiece comprising:
   a first movable member for carrying an electrode;
   servo control means for controlling the speed of said first movable member in response to the voltage between said electrode and a surface of said workpiece;
   a second movable member against which said first member is located in relative sliding engagement;
   said first and second movable members having overlapping portions for limiting the motion of said first movable member in a direction toward said workpiece and with respect to said second movable member by causing abutting engagement;
   sensing and signalling means coupled to said second movable member for sensing the relative position of said first movable member with respect to said second movable member and generating a position signal related thereto; and
   drive means responsive to said position signal for moving said second movable member toward said workpiece at a speed relative to the speed of said first movable member so as to control the abutting of said overlapping portions,
   whereby after the abutting of said overlapping portions, the speed of said first movable member toward said workpiece and the speed of said electrode are controlled by the speed of said second movable member toward said workpiece.

2. Electro-discharge machining apparatus according to claim 1 wherein said drive means comprises a stepping motor coupled via a lead screw, to said second movable member.

3. Electro-discharge machining apparatus according to claim 2 wherein said sensing and signalling means comprises a coil controlled oscillator for generating signals related to the proximity of said first and second movable members.

4. Electro-discharge machining apparatus according to claim 3 further including a timer mechanism coupled to said stepping motor for controlling the time taken for said stepping motor to reach a speed of operation which will ensure abutting of said overlapping portions, after said motor has received a first position signal from said sensing and signalling means.

5. Electro-discharge apparatus according to claim 4 wherein said timer mechanism includes means for effecting a series of motor speed changes from a first speed which drives said second movable member faster than said first movable member, to a final speed which drives said second movable member more slowly than said first movable member, so as to ensure the obtaining of abutting of said overlapping portions, said speed changes being caused to occur at equal time intervals.

* * * * *